(12) United States Patent
Withers et al.

(10) Patent No.: US 7,794,580 B2
(45) Date of Patent: *Sep. 14, 2010

(54) THERMAL AND ELECTROCHEMICAL PROCESS FOR METAL PRODUCTION

(75) Inventors: James C. Withers, Tucson, AZ (US); Raouf O. Loutfy, Tucson, AZ (US)

(73) Assignee: Materials & Electrochemical Research Corp., Tucson, AZ (US)

( * ) Notice: Subject to any disclaimer, the term of this patent is extended or adjusted under 35 U.S.C. 154(b) by 1035 days.

This patent is subject to a terminal disclaimer.

(21) Appl. No.: 11/294,872

(22) Filed: Dec. 6, 2005

(65) Prior Publication Data

US 2006/0237327 A1    Oct. 26, 2006

Related U.S. Application Data

(63) Continuation-in-part of application No. 10/828,641, filed on Apr. 21, 2004, now Pat. No. 7,410,562.

(51) Int. Cl.
| C25C 3/28 | (2006.01) |
|---|---|
| C25C 3/26 | (2006.01) |
| C25C 3/30 | (2006.01) |
| C25C 3/32 | (2006.01) |
| C25C 3/34 | (2006.01) |
| C25C 3/00 | (2006.01) |

(52) U.S. Cl. .............. 205/560; 205/572; 205/573; 205/574; 205/577; 205/587; 205/594; 205/602

(58) Field of Classification Search .............. 205/572, 205/573, 574, 577, 587, 594, 602; 75/10.23, 75/10.25, 10.26
See application file for complete search history.

(56) References Cited

U.S. PATENT DOCUMENTS

| | | | |
|---|---|---|---|
| 2,302,604 A | 11/1942 | Dolbear | |
| 2,681,847 A | 6/1954 | Wainer et al. | 23/202 |
| 2,681,848 A | 6/1954 | Wainer et al. | 23/202 |
| 2,681,849 A | 6/1954 | Sibert et al. | 23/202 |
| 2,698,221 A | 12/1954 | Wainer et al. | 23/202 |
| 2,707,168 A | 4/1955 | Wainer et al. | |
| 2,722,509 A | 11/1955 | Wainer | 204/64 |
| 2,733,133 A | 1/1956 | Cave et al. | 23/202 |
| 2,743,166 A | 4/1956 | Wainer et al. | 23/202 |
| 2,750,259 A | 6/1956 | Steinberg et al. | 23/202 |
| 2,792,310 A | 5/1957 | Steinberg et al. | 106/43 |
| 2,798,844 A | 7/1957 | Freedman | 204/64 |
| 2,828,251 A | 3/1958 | Sibert et al. | 204/39 |
| 2,831,802 A | 4/1958 | Raney | 204/10 |
| 2,833,704 A | 5/1958 | Wainer | 204/64 |
| 2,848,303 A | 8/1958 | Copper | 23/202 |
| 2,868,703 A | 1/1959 | Wainer | |
| 2,880,149 A | 3/1959 | Carlton et al. | 204/64 |
| 2,904,426 A | 9/1959 | Wainer | 204/64 |
| 2,904,428 A | 9/1959 | Dean | 75/614 |
| 2,909,473 A | 10/1959 | Dean et al. | 205/399 |
| 2,913,379 A | 11/1959 | Steinberg | 204/64 |
| 2,939,823 A | 6/1960 | Rand | 205/400 |
| 2,994,650 A | 8/1961 | Slatin | 205/47 |
| 3,047,477 A | 7/1962 | Spraul et al. | |
| 3,078,149 A | 2/1963 | Barber | 23/202 |
| 3,083,153 A | 3/1963 | Wagner | 204/64 |
| 3,098,805 A | 7/1963 | Ervin et al. | |
| 3,137,641 A | 6/1964 | Slatin | 205/398 |
| 3,794,482 A | 2/1974 | Anderson et al. | 75/84.1 |
| 3,825,415 A | 7/1974 | Johnston et al. | 75/84.5 |
| 3,850,615 A * | 11/1974 | Reeves | 75/435 |
| 3,853,536 A | 12/1974 | Tylko | 75/3 |
| 3,880,729 A | 4/1975 | Kellner | 205/99 |
| 3,915,837 A | 10/1975 | Feige, Jr. | 204/290.12 |
| 3,941,583 A | 3/1976 | Martin et al. | 75/4 |
| 3,989,511 A | 11/1976 | Fey et al. | 75/0.5 |
| 4,080,194 A | 3/1978 | Fey | 75/10 |
| 4,107,445 A | 8/1978 | Wolf et al. | 13/2 |
| 4,127,409 A | 11/1978 | Megy | 75/84.4 |
| 4,338,177 A | 7/1982 | Withers et al. | 204/243 |
| 4,342,637 A | 8/1982 | Withers et al. | 204/282 |
| 4,373,947 A | 2/1983 | Buttner et al. | 75/0.5 |
| 4,409,083 A | 10/1983 | Upperman et al. | 204/245 |
| 4,431,503 A | 2/1984 | Withers et al. | 204/294 |
| 4,521,281 A | 6/1985 | Kadija | 205/398 |
| 4,668,501 A | 5/1987 | Shibuta et al. | 423/608 |

(Continued)

FOREIGN PATENT DOCUMENTS

CA    626363    8/1961

(Continued)

OTHER PUBLICATIONS

"The Production of Ductile Titanium", Kroll, Paper presented at the Seventy-Eighth General Meeting, 1940, pp. 35-47.

(Continued)

*Primary Examiner*—Bruce F Bell
(74) *Attorney, Agent, or Firm*—Hayes Soloway P.C.

(57) ABSTRACT

A method of winning a metal from its oxide ore by heating the ore in a partial vacuum or under an inert atmosphere in the presence of a reductant. The resulting product may be further reduced electrochemically to produce a purer metal.

52 Claims, 7 Drawing Sheets

U.S. PATENT DOCUMENTS

| | | | |
|---|---|---|---|
| 4,670,110 A | 6/1987 | Withers et al. | 204/67 |
| 4,851,089 A | 7/1989 | Honders et al. | 205/363 |
| 4,931,213 A | 6/1990 | Cass | 252/507 |
| 5,215,631 A | 6/1993 | Westfall | 205/351 |
| 5,224,534 A | 7/1993 | Shimizu et al. | 164/469 |
| 5,328,501 A * | 7/1994 | McCormick et al. | 75/352 |
| 5,340,447 A | 8/1994 | Bertaud et al. | 205/47 |
| 5,679,131 A * | 10/1997 | Obushenko | 75/435 |
| 5,772,724 A | 6/1998 | Inoue et al. | 75/10.13 |
| 6,063,254 A | 5/2000 | Rosenberg et al. | 205/398 |
| 6,231,636 B1 | 5/2001 | Froes et al. | 75/352 |
| 6,540,902 B1 | 4/2003 | Redey et al. | 205/354 |
| 6,663,763 B2 | 12/2003 | Strezov et al. | 205/367 |
| 7,410,562 B2 | 8/2008 | Withers et al. | 205/367 |
| 7,470,351 B2 | 12/2008 | Smedley et al. | 204/281 |
| 2002/0139667 A1 | 10/2002 | Wang | 204/298.13 |
| 2003/0057101 A1 | 3/2003 | Ward Close et al. | 205/363 |
| 2003/0061909 A1* | 4/2003 | Negami et al. | 75/485 |
| 2004/0194574 A1 | 10/2004 | Cardarelli | |
| 2005/0034561 A1 | 2/2005 | Liebaert | 75/351 |
| 2005/0166706 A1* | 8/2005 | Withers et al. | 75/10.23 |

FOREIGN PATENT DOCUMENTS

| | | |
|---|---|---|
| CN | 1376813 | 10/2002 |
| CN | 1376813 A | 10/2002 |
| CN | 1712571 | 12/2005 |
| FR | 1.167.261 | 11/1958 |
| GB | 251527 | 5/1926 |
| GB | 452269 | 3/1936 |
| GB | 635267 | 4/1950 |
| GB | 825872 | 12/1959 |
| JP | 30-7554 | 10/1930 |
| JP | 43-8334 | 3/1943 |
| JP | 43-19739 | 8/1943 |
| JP | 45-25561 | 8/1970 |
| JP | 01-096390 | 4/1989 |
| JP | 61-031302 | 4/1989 |
| WO | WO 99/64638 | 12/1999 |
| WO | WO 02/066711 | 8/2002 |
| WO | WO 02/083993 | 10/2002 |
| WO | WO 03/002785 | 1/2003 |
| WO | WO 03/002785 | 3/2003 |
| WO | WO 03/046258 | 5/2003 |
| WO | WO 03/046258 | 6/2003 |

OTHER PUBLICATIONS

"Metallic Titanium" Hunter, General, Physical and Inorganic, pp. 330-338.

"Why Produce Titanium by EW?" Ginatta, Industrial insight, 2000, pp. 18-20.

"Some Observations on the Kroll Process for Titanium" Wartman et al., Journal of the Electrochemical Society, 1954, pp. 507-513.

"Direct Electrochemical Reduction of Titanium Dioxide to Titanium in Molten Calcium Chloride" Chen et al., Letters to Nature, vol. 407, 2000, pp. 361-364.

"The Fusion Electrolysis of Titanium, Sixth Castner Memorial Lecture" Kroll, Chemistry and Industry, 1960, pp. 1314-1322.

"Sodium Reduction of Titanic Chloride" Homme et al., Report of Investigations 5398, 1958, pp. 1-29.

"Mechanism of Sodium Reduction of Titanium Chloride in Fused Salts" Henri et al., Report of Investigations 5661, pp. 1-37.

Yasuhiki Ito, Toshiyuki Nohira, "Non-conventional electrolytes for electrochemical applications", Electrochimica ACTA, Elsevier Science Publishers, Barking, GB, vol. 45, No. 15-16, May 2000, pp. 2613-2622.

A. Robin and R.B. Ribeiro, "Pulse electrodeposition of titanium on carbon steel in the LiF-NaF-KF eutectic melt", J. Applied Electrochemistry, vol. 30, 2000, pp. 239-246.

Ananth et al., "Single Step Electrolytic Production of Titanium", Trans. Indian Inst. Met., vol. 51, No. 5, Oct. 1998, pp. 339-403.

Kiparisov et al., "Obtaining of Titanium Powder byOre Concentrates Treatment", Science of Sintering, vol. 17, No. 3, Sep. 1985, pp. 139-144.

Hashimoto, Yasuhiko, "Studies of Electrowining of Titanium from Titanium Oxides in CaF3-MgF2 Molten Salt Baths", Hashimoto Journal, 40, No. 1, 1972, pp. 1-13.

Jiao et al., "Titanium electrolysis using TiCxOy anode prepared through carbothermic reduction of titanium dioxide", School of Metallurgical and Ecological Engineering, University of Science and Technology Beijing, pp. 867-869.

Hashimoto, "Sintered Titanium Carbide as the Soluble Anode for Fused-Salt Electrolysis", Dep. Mater. Sci., Himeji Inst. Technol., Himeji, Japan, Journal written in Japanese, 1971, pp. 487-493, Abstract only.

Hasimoto, "Extraction of titanium from soluble anodes of arc-reduced titanium-carbon-oxygen and titanium carbide",Dep. Mater. Sci., Himeji Inst. Technol., Journal written in Japanese, 1971, pp. 282-288, Abstract only.

Hashimoto, "Anodic extraction of titanium from low-grade(δ)—titanium-carbon-oxygen alloy by fused-salt electrolysis", Dep. MaterSci. Himeji Inst. Technol., Himeji, Japan, Journal writtenin Japanese, 1971, pp. 480-486, Abstractonly.

Hashimoto, "Electrodeposition of pure titanium metal by double-stage fused-salt electrolysis", Dep. Mater. Sci. Himeji Inst. Technol., Himeji, Japan, Journal written in Japanese, 1968, pp. 108-119, Abstract only.

Hashimoto, "Electrowinning of titanium from its oxides. III. Electrowinning of titanium from titanium dioxide or calcium titanate in calcium fluoride-magnesium fluoride molten bath salts", Dep. Mater. Sci., Himeji Inst. Technol., Himeji, Japan, 1972, pp. 39-44, Journal written in Japanese, Abstract only.

ASM International, Materials Park, Ohio, Powder Metal Technologies and Applications, vol. 7, "Production Sintering Practices", pp. 499-501. 1998.

Official Action received in corresponding U.S. Appl. No. 11/536,599, dated Dec. 2008.

Australian Official Action, dated Apr. 14, 2009, (3 pgs).

Official Action received in Applicants' related U.S. Appl. No. 11/536,599, dated Sep. 10, 2009.

Chinese Official Action and Translation, dated Feb. 12, 2010, 7 pgs.

Official Action received in Applicants' related U.S. Appl. No. 11/536,599.

JP Official Action + Translation, dated Apr. 16, 2010 JP Patent Appln. No. 2006-523976 (7 pgs).

Official Action received in Applicants' related U.S. Appl. No. 11/427,984.

* cited by examiner

FIG. 1

XRD OF STOICHIOMETRIC TiO$_2$-C HEAT TREATED IN ARGON AT 1300°C FOR ONE HOUR

FIG. 2

XRD OF STOICHIOMETRIC TiO$_2$-C HEAT TREATED IN ARGON AT 1400°C FOR ONE HOUR

XRD OF STOICHIOMETRIC $TiO_2$-C HEAT TREATED TO 1450°C IN ONE STEP FOLLOWED BY HEAT TREATMENT AT 2100°C IN VACUUM

FIG. 6

XRD OF 1:1 $TiO_2$-Ti HEAT TREATED TO 1760°C IN VACUUM

FIG. 7

XRD OF STOICHIOMETRIC $TiO_2$-C HEAT TREATED TO 1450°C WITH A SECOND HEAT TREATMENT TO 1800°C IN HIGH VACUUM 1 (TiO MAJOR (95%)
2 (TiO) MINOR (-5%)

FIG. 8

XRD OF STOICHIOMETRIC $TiO_2$-C FROM PHENOLIC IN A PREMIX HEAT TO 1450°C AT ONE ATMOSPHERIC PRESSURE IN ARGON

TiO MAJOR (+95%)
$Ti_2O_3$ MINOR (-5%)

FIG. 9

XRD OF STOICHIOMETRIC $TiO_2$-C FROM A 110°C SOFTENING POINT COAL TAR PITCH MIXED AT 190°C AND HEAT TREATED AT 1650°C AT ATMOSPHERIC PRESSURE IN ARGON

FIG. 10

XRD OF SLAG-C FROM A 110°C SOFTENING POINT COAL TAR PITCH MIXED AT 190°C AND HEAT TREATED AT 1650°C AT ATMOSPHERIC PRESSURE IN ARGON

FIG. 11
ILMENITE ORE TREATED WITH AN INTIMATE CARBON COATING ON ORE PARTICLES WITH HEAT TREATMENT TO 1650°C IN ARGON

FIG. 12
ILMENITE ORE TREATED WITH AN INTIMATE CARBON COATING ON ORE PARTICLES WITH HEAT TREATMENT TO 1650°C IN ARGON PLUS 1800°C IN A VACUUM LOWER THAN $10^{-3}$ Torr

THERMAL AND ELECTROCHEMICAL PROCESS FOR METAL PRODUCTION

CROSS REFERENCE TO RELATED APPLICATIONS

This application is a continuation-in-part of U.S. application Ser. No. 10/828,641, filed Apr. 21, 2004 now U.S. Pat. No. 7,410,562.

STATEMENT REGARDING FEDERALLY SPONSORED RESEARCH OR DEVELOPMENT

This invention was made in part with Government support under contract number W911QX-04-0009 awarded by the U.S. Army and MDA972-03-C-0034 awarded by the Defense Advanced Research Projects Agency (DARPA). The Government may have certain rights in the invention.

FIELD OF THE INVENTION

The present invention relates to the production of metals. The invention has particular utility in connection with the production of titanium and will be described in connection with such utility, although other utilities are contemplated, e.g., production of other high value multi-valence and high (2 or more) valence metals, in particular refractory metals such as chromium, hafnium, molybdenum, niobium, tantalum, tungsten, vanadium and zirconium which are given as exemplary.

BACKGROUND OF THE INVENTION

The properties of titanium have long been recognized as a light, strong, and corrosion resistant metal, which has lead to many different approaches over the past few decades to extract titanium from its ore. These methods were summarized by Henrie [1]. Despite the many methods investigated to produce titanium, the only methods currently utilized commercially are the Kroll and Hunter processes [2, 3]. These processes utilize titanium tetrachloride ($TiCl_4$) which is produced from the carbo-chlorination of a refined titanium dioxide ($TiO_2$) according to the reaction:

$$TiO_2(s)+2Cl_2(g)+2C(s) \rightarrow TiCl_4(g)+2CO(g).$$

In the Kroll process [2] $TiCl_4$ is reduced with molten magnesium at ≈800° C. in an atmosphere of argon. This produces metallic titanium as a spongy mass according to the reaction:

$$2Mg(l)+TiCl_4(g) \rightarrow Ti(s)+2MgCl_2(l)$$

from which the excess Mg and $MgCl_2$ is removed by volatilization, under vacuum at ≈1000° C. The $MgCl_2$ is then separated and recycled electrolytically to produce Mg as the reductant to further reduce the $TiCl_4$. In the Hunter process [3,4] sodium is used as a reductant according to the reaction:

$$4Na(l)+TiCl_4(g) \rightarrow Ti(s)+4NaCl(l)$$

The titanium produced by either the Kroll or Hunter processes must not only be separated from the reductant halide by vacuum distillation and/or leaching in acidified solution to free the titanium sponge for further processing to useful titanium forms, but also require the recycling of the reductant by electrolysis. Because of these multiple steps the resultant titanium is quite expensive which limits its use to cost insensitive applications.

The high cost of the Kroll process results in a high cost of titanium products limiting their widespread utilization in spite of their exceptionally desirable properties. Since titanium's discovery, investigations have been conducted to produce titanium by more economical processing other than the metalothermic reduction such as magnesium or sodium reduction of $TiCl_4$, but without sufficient success to replace the high cost Kroll process. The intensive interest to develop low cost processing to produce titanium has recently spun several published processes. Since titanium primarily appears as the oxide ($TiO_2$), it can be conceived that an oxide feed to produce titanium could be more economical than making the chloride ($TiCl_4$) by carbo-chlorination of the oxide as the feed ($TiCl_4$) which is used in the Kroll process.

The US Bureau of Mines performed extensive additional investigations [1,5-8] to improve the Kroll and Hunter processes. Many other processes have been investigated that include plasma techniques [9-13], molten chloride salt electrolytic processes [14], molten fluoride methods [15], the Goldschmidt approach [16], and alkali metal-calcium techniques [17]. Other processes investigated without measurable success have included aluminum, magnesium, carbothermic and carbo-nitrothermic reduction of $TiO_2$ and plasma reduction of $TiCl_4$[18]. Direct reduction of $TiO_2$ or $TiCl_4$ using mechanochemical processing of ball milling with appropriate reductants of Mg or calcium hydride ($CaH_2$) also have been investigated [19] without measurable success. Kroll, who is considered as the father of the titanium industry [20] predicted that titanium will be made competitively by fusion electrolysis but to date, this has not been realized.

An electrolytic process has been reported [21] that utilizes $TiO_2$ as a cathode and carbon or graphite as the anode in a calcium chloride electrolyte operated at 900° C. By this process, calcium is deposited on the $TiO_2$ cathode, which reduces the $TiO_2$ to titanium and calcium oxide. However, this process is limited by diffusion of calcium into the $TiO_2$ cathode and the build-up of calcium oxide in the cell, which limits operating time to remove the calcium oxide or replacement of the electrolyte. Also the $TiO_2$ cathode is not fully reduced which leaves contamination of $TiO_2$ or reduced oxides such as TiO, mixed oxides such as calcium titanante as well as titanium carbide being formed on the surface of the cathode thus also contaminating the titanium.

In the Fray-Farthing-Chen (FFC) Cambridge process, or simply, the Fray process, titanium dioxide ($TiO_2$) is utilized as a cathode and electrolyzed with a graphite anode in molten calcium chloride ($CaCl_2$) which allegedly removes the oxygen from the $TiO_2$ in pellet form leaving titanium and with the graphite anode produces $CO_2$ at the anode. A fundamental teaching is that the oxygen ionized from the $TiO_2$ in the cathode must be dissolved in the electrolyte which is $CaCl_2$ for transport to the anode. In addition, it is stated that calcium titanites ($Ca_xTi_yO_z$) are formed as well as toxic chlorine is also given off initially at the anode. In technical public symposium, presenters of the FFC process have noted that the formation of calcium titanite is a problem to producing titanium metal and that the Columbic efficiency is very low at under 20% thus making the process expensive. Independent analysis, US Dept. of Energy Contract 4000013062 report, implies the cost of the FFC process is more expensive than the Kroll process and the product does not meet the purity of the standard Kroll material.

International patent publications WO 02/066711 A1, WO 02/083993 A1, WO 03/002785 A1 and U.S. Pat. No. 6,663,763 B2 also utilize $TiO_2$ as a cathode feed to electrolytically extract oxygen to produce titanium metal remaining at the cathode with oxygen discharged at the anode. Each of these publications state the Fray/FFC process produces titanium with residual oxygen, carbon and calcium titanite which is unsuitable for commercial use. International patent publication WO 02/066711 A1 to Strezov et al., assigned to BHP Steel, Ltd., reports that the Fray et al. process consist of ionizing oxygen at the titania ($TiO_2$) cathode under applied potential which oxygen removed or ionized from the $TiO_2$ cathode is dissolved in the $CaCl_2$ electrolyte and is transported to a graphite anode to be discharged as $CO_2$. The first aspect of the teachings of WO 02/066711 A1 is that the electrical contact to the $TiO_2$ cathode influences the reduction process and that a high resistive electrical conductor to the cathode is made part of the cathode. It is further reported the oxygen removed from the $TiO_2$ cathode in a pellet form passes onto solution and/or chemically reacts with the electrolyte cation. The teaching is that deposition of the cation at the cathode is prevented through controlled potential at under 3.0V in the $CaCl_2$ electrolyte. It is stated $Al_2O_3$ in the cathode with $TiO_2$ can also be reduced but non-uniformly with the only reduction taking place where the $Al_2O_3$ touches the cathode conductor. The publication WO 02/066711 A1 teaches the $TiO_2$ must be made into a pellet and presintered before use as a cathode and states the Fray et al. application mechanism is incorrect, produces 18 wt % carbon in the final titanium pellet as well as calcium titanites and silicates if silica is in the titania ($TiO_2$) pellets. This publication claims to avoid or prevent anode material (graphite/carbon) from transport into the cathode, but provides no teaching of how this is accomplished.

International publication WO 02/083993 A1 to Stresov et al. assigned to BlueScope Steel, Ltd., formerly BHP Steel, Ltd., teaches that the electrolyte to cathodically reduce pelletized $TiO_2$ must be calcium chloride containing CaO. This publication states that the $CaCl_2$ electrolyte is operated to produce $Ca_{++}$ cations which provide the driving force that facilitate extraction of $O_{--}$ anions produced by the electrolytic reduction of titania ($TiO_2$) at the cathode. It is reported that Ca metal exist in the electrolyte and that it is responsible for the chemical reduction of titania ($TiO_2$). It is also reported that significant amounts of carbon are transferred from the anode to the cathode thus contaminating the titanium and was responsible for low energy efficiency of the cell. This publication teaches replacing the carbon anode with a molten metal anode of silver or copper to eliminate carbon contamination of the reduced $TiO_2$. The teaching is that the cell potential be at least 1.5V but less than 3.0V with a cell potential above the decomposition potential of CaO. Again the titania ($TiO_2$) cathode is in the form of a solid such as a plate.

International publication WO 03/002785 A1 to Strezov, et al., also assigned to BHP Steel, Ltd., teaches the oxygen contained in the solid form of titantia ($TiO_2$) is ionized under electrolysis which dissolves in the $CaCl_2$ electrolyte. It is taught that the operating cell potential is above a potential at which cations are produced which chemically reduce the cathode metal oxide/$TiO_2$. It is further stated that chlorine ($Cl_2$) gas is removed at the anode at potentials well below the theoretical deposition, that $Ca_xTi_yO_z$ is present at the $TiO_2$ cathode and that CaO is formed in the molten electrolyte bath which is $CaCl_2$ containing oxygen ions. It is also stated the potential of the cell must vary with the concentration of oxygen in the titanium requiring higher potentials at lower concentrations of oxygen to remove the lower concentrations of oxygen. It is unlikely to remove the oxygen from $TiO_2$ to low concentrations (i.e., 500 ppm) in a single stage operation. It is again taught that cations must be produced to chemically reduce the cathodic $TiO_2$ requiring refreshing the electrolyte and/or changing/increasing the cell potential. The method teaches carrying out the reduction of $TiO_2$ in a series of electrolytic cells of successively transferring the partially reduced titanium oxide to each of the cells in the series. The cell potential is above the potential at which Ca metal can be deposited via the decomposition of CaO wherein the Ca metal is dissolved in the electrolyte which migrates to the vicinity of the cathode $TiO_2$.

In U.S. Pat. No. 6,663,763 B2 which is substantially the same as international publication WO 02/066711 A1, it is taught that CaO must be electrolyzed to produce calcium metal and $Ca_{++}$ ions which reduce the titania ($TiO_2$) in the cathode with oxygen ($O^=$) migrating to the anode. This is very unlikely the mechanism. If Ca in metallic ($Ca^o$) or ionic ($Ca^{++}$) form reduces the $TiO_2$ the product of reduction will be CaO i.e., $TiO_2+2Ca=Ti+2CaO$. The produced calcium from electrolysis must diffuse into the titania ($TiO_2$) pellet to achieve chemical reduction as claimed and the formed CaO will then have to diffuse out of the Ti/$TiO_2$ which has been preformed and sintered into a pellet. If calcium metal ($Ca^o$) or ions ($Ca^{++}$) are produced by electrolysis, the oxygen ions ($O^=$) produced from that electrolysis can diffuse to the anode. The calcium produced at the cathode and diffused into the bulk of the cathode thus chemically reducing the $TiO_2$, will form CaO which must become soluble in the electrolyte ($CaCl_2$) and diffuse out of the cathode before additional calcium can diffuse into the inner portion of the cathode for the chemical reduction.

It is also known from x-ray diffraction of the cathode that calcium titanite ($CaTiO_3$) forms as the $TiO_2$ is reduced. A possible reaction is $O^{2-}+Ca^{2+}+TiO_2=CaTiO_3$ which remains as a contaminate in the cathodically reduced $TiO_2$ to Ti.

U.S. Pat. No. 6,540,902 B1 to Redey teaches that a dissolved oxide in the electrolyte is required to cathodically reduce a metal oxide such as $UO_2$. The example is $Li_2O$ in LiCl and the oxygen-ion species is dissolved in the electrolyte for transport to the anode which is shrouded with a MgO tube to prevent back diffusion of oxygen. It is reported the cathodic reduction of the oxide (examples $UO_2$ and $Nb_2O_3$) may not take place if the cathode is maintained at a less negative potential than that which lithium deposition will occur. The electrolyte (LiCl) should contain mobile oxide ions which may compress titanium oxide whose concentration of the dissolved oxide species are controlled during the process by controlled additions of soluble oxides. Which titanium oxide is not defined, however, as there are a plethora of different titanium oxides. It is generally known titanium oxides are not soluble in molten salts which accounts for the fact titanium is not electrowon from an oxide feed analogous to aluminum being electrowon from the solubility of $Al_2O_3$ in cryolite/sodium fluoride. While the Redey patent teaches cathodic reduction of $UO_2$ and $Nb_2O_3$ in a LiCl/$Li_2O$ electrolyte, no residual oxygen concentrations are given in the cathode but it was estimated the reduction was 90% complete and no teaching is suggested $TiO_2$ would be reduced to very low oxygen levels.

International publication WO 03/046258 A2 to Cardarelli, assigned to Quebec Iron and Titanium Inc. (QIT) provides a review of electrolysis processes to produce titanium including Fray et al. This patent publication teaches a process analogous to Fray et al. except the process is carried out at a temperature above the melting point of titanium which is approximately 1670° C. A liquid slag containing titantia is used as a cathode on a cell bottom with an electrolyte such as $CaF_2$ floating on top and in contact with anodes such as graphite. Under electrolysis, the impure metals such as iron are deposited at the molten electrolyte titania slag interface and sink to the bottom of the slag since the iron is heavier. After the iron and/or other impurities are removed, titanium is reportedly deposited at the molten slag electrolyte interface and also sinks through the slag settling to the bottom of the cell for subsequent tapping. Oxygen ions diffuse through the electrolyte to an upper anode of graphite. It is suggested the overall reaction is $TiO_2$ (liquid)+C (solid)=Ti (liquid)↓+$CO_2$ (gas)↑.

No specific oxygen residual in the harvested titanium is provided.

Thus, current $TiO_2$ cathode electrolytic processes are no more commercially viable than earlier electrolytic processes.

It is known that metals can be won from their oxide ores by heating with a reductant which typically is carbon. Carbothermic reduction has been established as the most economical process to produce a metal in its pure metallic form. However, carbothermic reduction is not always possible to win a metal from its ore due to not sufficiently reducing impurities within the ore and/or not fully reducing the oxide which may lead to forming the carbide versus complete reduction of the metal oxide. Thus, oxides such as alumina ($Al_2O_3$) have not produced pure aluminum by carbothermic reduction. Similarly $TiO_2$ heretofore has not been carbothermically reduced to produce pure titanium. However, in our co-pending parent application, U.S. Ser. No. 10/828,641, filed Apr. 21, 2004, we describe how $TiO_2$ could be carbothermically reduced to TiO. Further investigations have shown it is possible to carbothermically remove more oxygen from the TiO to produce a suboxide of titanium, i.e., having a ratio of oxygen to titanium less than one. The more oxygen removed by the highly efficient and low cost carbothermic reduction, the less required to be removed by electrons in electrolytic reduction which frequently is quite inefficient. Thus the carbothermic reduction of $TiO_2$ as the first process step of producing titanium from $TiO_2$ is enabling.

Titanium is the fourth most abundant metal in the Earths' crust in several mineral forms. The most common utilized minerals are rutile ($TiO_2$) and ilmenite ($FeTiO_3$). Calcium titanates are also an abundant source which contains the element titanium. Utilized as mined or purified through various leaching and/or thermal processing's $TiO_2$ is the most utilized compound which has applications as pigment and for carbo chlorination to produce $TiCl_4$ which is reduced with metals such as magnesium (Kroll Process) or sodium (Hunter Process) that produces titanium metal or the chloride is oxidized to produce a highly purified pigment.

Titanium exists in multivalent species of $Ti^{+4}$, $Ti^{+3}$, and $Ti^{+2}$ in various anionic compositions such as the oxide or chloride. Except for the oxide those compounds are typically unstable in the ambient atmosphere. In general there has been limited application of these subvalent compounds which has not generated processing to produce the subvalent oxides or others compounds.

The high cost of titanium metal has limited its usage to critical aerospace where weight reduction over rides cost sensitivity. Because of the high cost of producing titanium by the Kroll or Hunter processes the cost volume ratio of titanium has tended to be inelastic. The holy grail of titanium is to reduce the cost of the primary metal as well as down stream processing cost. Initiatives are known to be underway to improve efficiency and reduce cost of the basic Kroll and Hunter processes as well as alternative processing involving electrolytic processing. It is known as stated above the FFC Cambridge process which cathodically reduces $TiO_2$ in a calcium chloride process is under development to reduce the cost of primary titanium. It is also known that calcium titanate also forms in this process which limits the process commercial viability. It is also known if cathodic reduction were conducted with a titanium suboxide such as TiO the calcium titanate problem would be eliminated as there is insufficient oxygen to straight forwardly form calcium titanate. It is also generally known that thermal reduction of metal oxides is more economical than using electrons produced by electrolysis which is why iron and many other metals are won by thermal reduction processes.

Since the initiation of the Kroll process to produce titanium in the mid twentieth century, it has been predicted titanium would be produced by an electrolytic process and that process would be similar to the Hall process to produce aluminum. The latter process consist of alumina ($Al_2O_3$) exhibiting solubility in fused cryolite ($Na_3AlF_6$) which is electrolyzed with a carbon anode that produces $CO_2$ with some CO and the metal aluminum. However, no equivalent process has been developed for solubalizing $TiO_2$. It is possible; however, that the suboxides of titanium can exhibit solubility in some fused salts that may include the alkali, alkaline earth and rare earth halides. However, no reliable low cost process has been available to produce the titanium suboxides that could be used as a feed to electrolytically produce titanium. The titanium suboxide could be utilized cathodically and electrolytically reduced to titanium metal without the calcium titanate problem when using $TiO_2$, and the titanium suboxide could be dissolved in fused salts with electrolysis with a carbon or inert anode to produce titanium. Either processing extreme can produce titanium more economically then the Kroll or Hunter processes. The enabling requirement to produce titanium by these electrolytic processes is a low cost source of titanium suboxides.

SUMMARY OF THE INVENTION

It is known that titanium suboxides as well as most metal suboxides can be produced by the metal reducing the highest valent oxide. For example silicon monoxide (SiO) can be produced by reducing $SiO_2$ with silicon (Si). That is $SiO_2$+Si+heat=2SiO. The $SiO_2$ can be reduced with other reductants but the product is contaminated with the reductant as well as unwanted other compounds can be produced. For example $SiO_2$+C+heat=SiO and SiC+CO. Producing a titanium suboxide by reducing $TiO_2$ with titanium metal is uneconomical since titanium metal must first be produced. Also if carbon is utilized as the reducing agent, titanium carbide is typically a contaminate. Titanium carbide has a very high free energy of formation which is exceeded only by zirconium and hafnium carbide. The free energy of formation of TiC is approximately 183 KJ/mole which makes it formation prominent in any carbon reduction process. As used herein the term "carbon" is meant to include carbon in any of its several crystalline forms including, for example, graphite. However, because of the economics of carbon and thermal reduction, the carbo-thermic reduction of $TiO_2$ would be ideal to produce titanium suboxides if the formation of TiC can be prevented and only one suboxide produced such as $Ti_2O_3$ or TiO.

BRIEF DESCRIPTION OF THE DRAWINGS

Further features and advantages of the present invention will be seen from the following detailed description, taken in conjunction with the accompanying drawings wherein.

DETAILED DESCRIPTION OF THE INVENTION

To establish if a suboxide of titanium could be carbothermically produced several trials of mixing various carbon sources such as coke and carbon black, and heating to various temperatures at various pressures was performed.

Experimental Investigations to Carbothermically Reduce $TiO_2$

Figure 1:
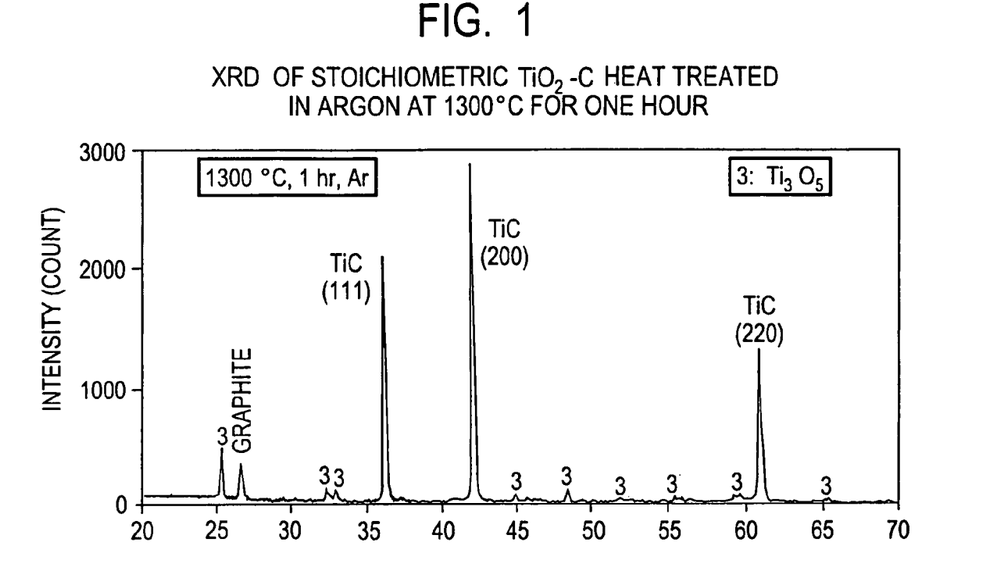
FIGS. 1-3 show the XRD patterns of stoichiometric $TiO_2$—C heat treated in argon at 1300° C., 1400° C. and 1750° C. for one hour, respectively.
Figure 2:
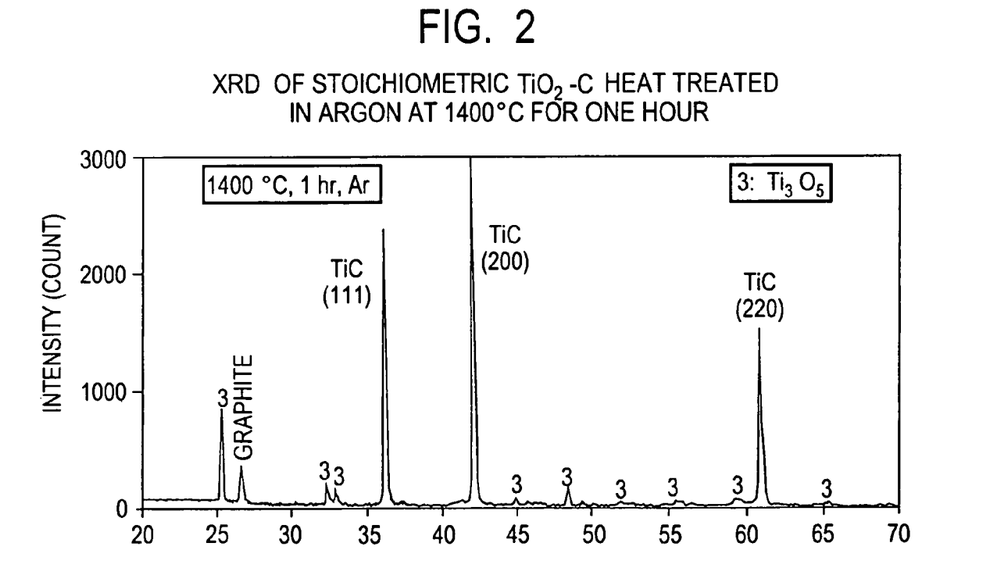
Figure 3:
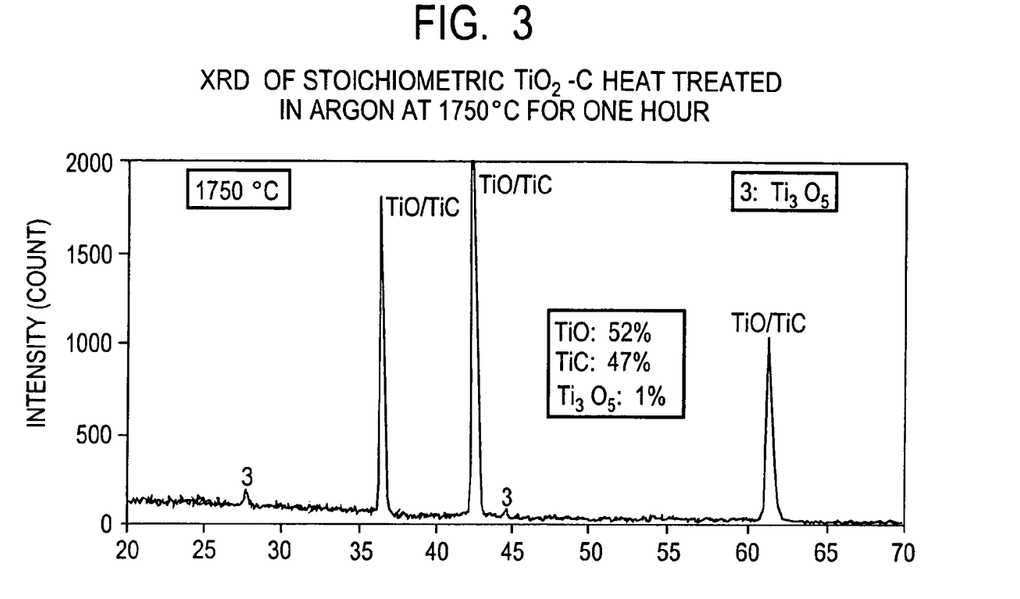

Stoichiometric amounts of $TiO_2$ powder and a source of carbon as finely ground coke or carbon black were mixed in a ball mill for periods up to 24 hours. The thoroughly mixed $TiO_2$ and carbon were then heat treated in a graphite element furnace purged with argon. The initial heat treatment was performed at 1300° C. for one hour. The heat treated mixed powder was subjected to x-ray diffraction (XRD) with the results showed in FIG. 1. As can be seen, the major product is TiC with a minor amount of $Ti_3O_5$. A sample of the $TiO_2$—C was heat treated to 1400° C. with the results shown in FIG. 2. A sample was heated to 1750° C. which also produced major amounts of TiC as shown in FIG. 3. The heating container was a graphite crucial which it was thought may be contributing carbon to the TiC formation.

Duplicate experiments were run in a magnesium oxide (MgO) crucible with the following results:

| Compound | Graphite Crucible | MgO Crucible |
| --- | --- | --- |
| TiC % | 63 | 54 |
| TiO % | 22 | 46 |
| $Ti_2O_3$ % | 15 | 0 |

The small variation in compositions suggests the graphite crucible is not the major contribution to the formation of TiC.

Figure 4:
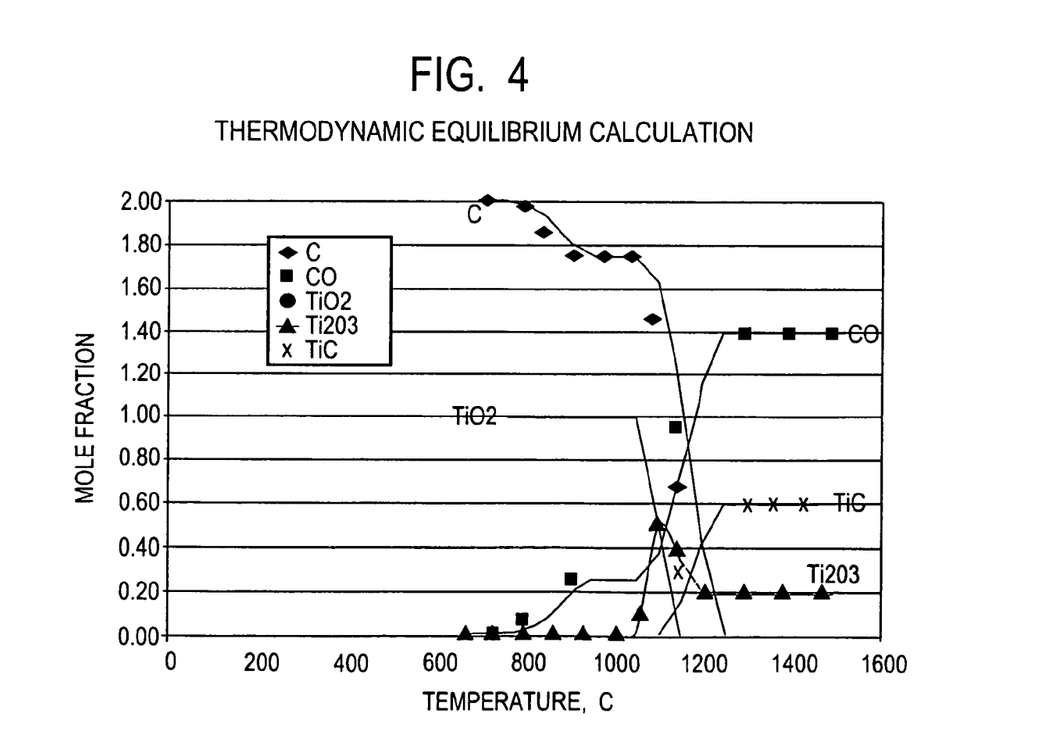
FIG. 4 shows thermodynamic equilibrium patterns thereof.

Duplicate experiments were run but instead of atmospheric argon, a vacuum was generated with a fore pump to about 0.1 atmosphere. The TiC concentration was reduced to approximately 20%, with 30% TiO and 50% $Ti_2O_3$. The TiC composition was reduced with an increase in $Ti_2O_3$. The TiC is in a +4 valence state and unacceptable as a reduced valence state feed for electrolytic producing titanium. A thermodynamic equilibrium calculation was performed as shown in FIG. 4 which indicates that TiC is a major product component above about 1100° C.

Figure 5:
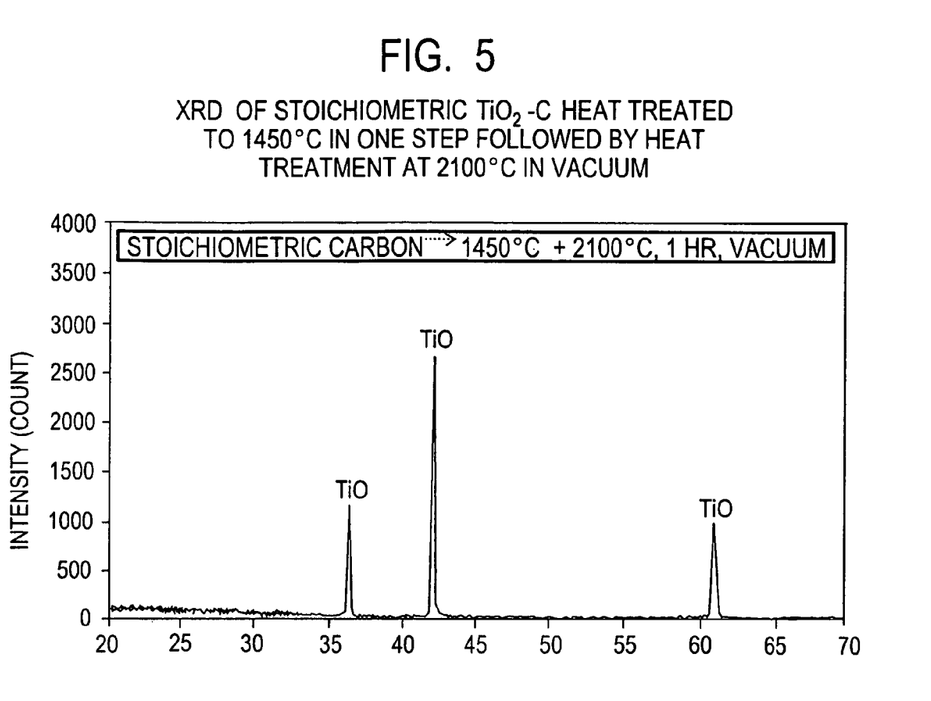
FIG. 5 shows the XRD patterns of stoichiometric $TiO_2$—C heat treated to 1450° C. in one step followed by heat treatment at 2100° C. in vacuum.

A two step heat treatment was performed which consisted of first heating to 1450° C. and then in a second step heating to 2100° C. in vacuum of approximately 0.1 atmosphere. In this case only TiO was formed as shown in FIG. 5. Desirably TiO which is in a +2 valence is produced and serves as a feed to electrolytically produce titanium. However, heating to 2100° C. in vacuum is an expensive batch operation not conducive to commercial production of titanium at low cost, consequently less severe heat treatments were investigated to produce TiO.

Figure 6:
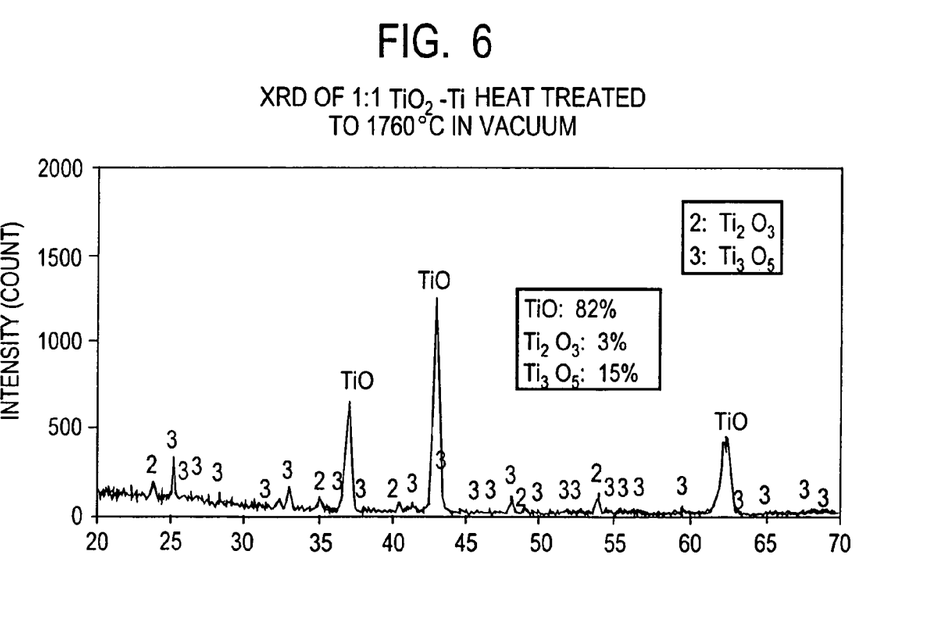
FIG. 6 shows the XRD patterns of 1:1:$TiO_2$—Ti heat treated to 1760° C. in vacuum.

First it was decided to define a base line using titanium metal to reduce $TiO_2$. Different ratios of $TiO_2$ to Ti were investigated. The best was a 1:1 ratio heat treated at 1760° C. also in vacuum which is shown in FIG. 6. As seen some higher oxides of $Ti_3O_5$ and $Ti_2O_3$ remained and pure TiO was not formed at these process conditions.

Figure 7:
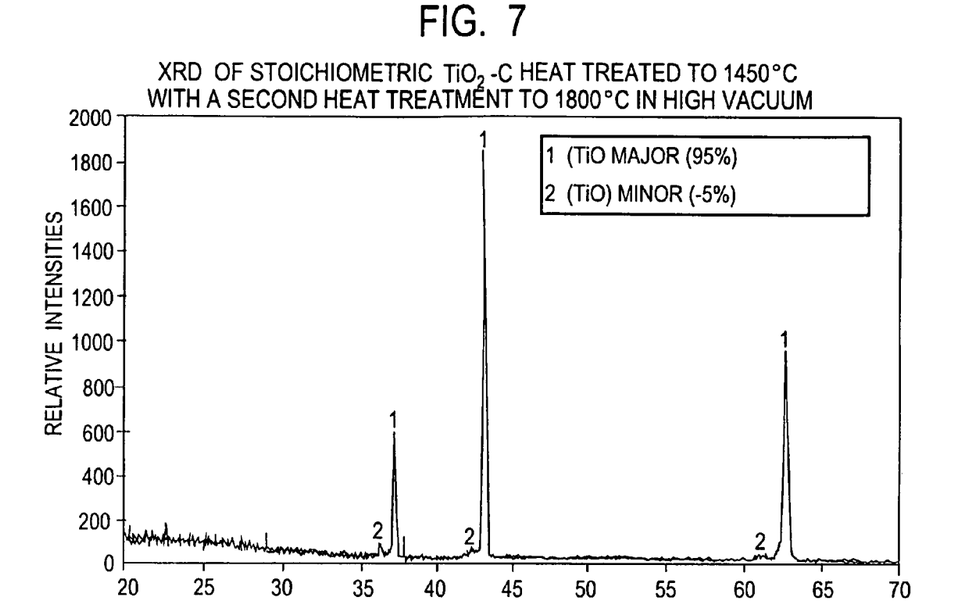
FIG. 7 shows the XRD patterns of stoichiometric $TiO_2$—C heat treated to 1450° C. with a second heat treatment to 1800° C. in high vacuum.

To avoid the high temperature treatment of 2100° C. to produce the TiO as shown in FIG. 5, the two stage treatment of first heating to 1450° C. to expel most of the CO followed by heating to 1800° C. in high vacuum was run. The result is shown in FIG. 7 which shows that TiO was indeed formed and some product desirably contained less oxygen than a 1:1 ratio to titanium. As desirable as this may be, the 1800° C. high vacuum treatment may be too costly to produce low cost titanium commercially. It is therefore desirable to develop less expensive processing to produce TiO.

Figure 8:
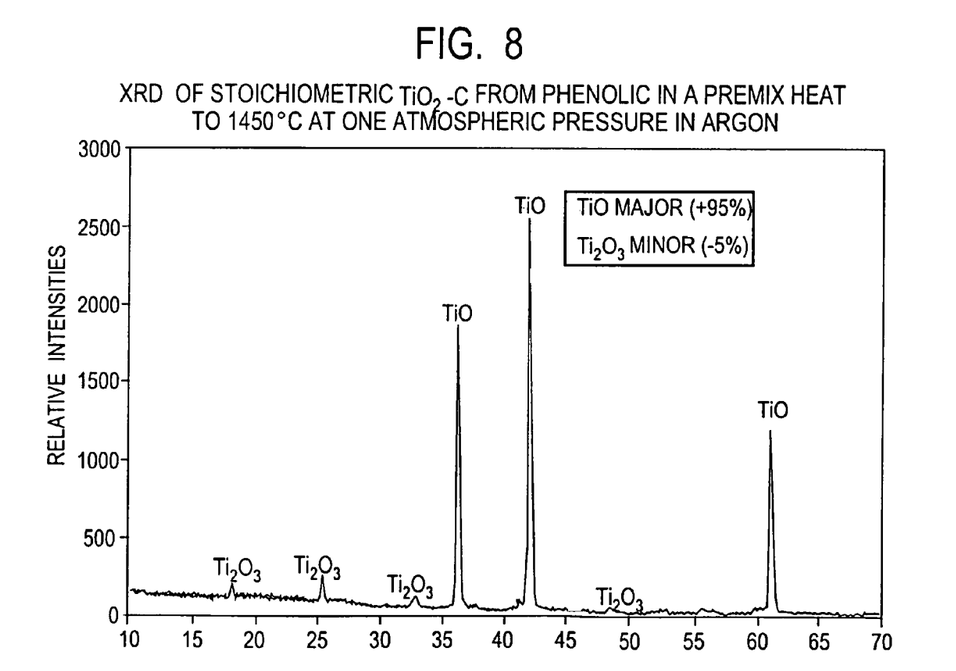
FIG. 8 shows the XRD patterns of stoichiometric $TiO_2$—C from phenolic in a pre-mix heat to 1450° C. at one atmosphere pressure in argon.
Figure 9:
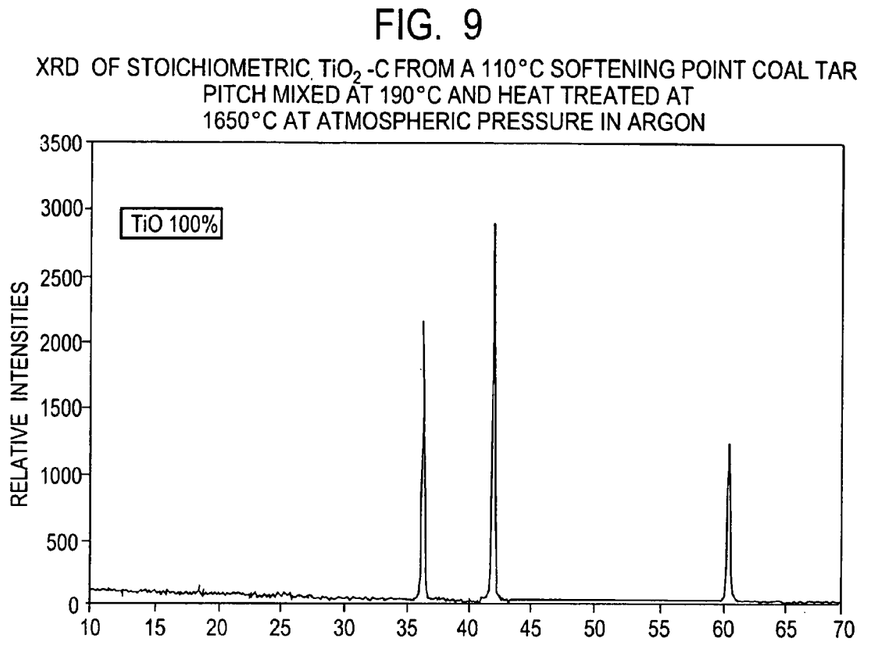
FIG. 9 shows the XRD patterns of stoichiometric $TiO_2$—C from a 110° C. softening point coal tar pitch mixed at 190° C. and heat treated at 1650° C. at atmospheric pressure in argon.

The process given above was the through mixing of a carbon powder source and $TiO_2$ powder followed by the heat treatment steps discussed. A different approach to producing carbon and $TiO_2$ is to utilize a liquid which when pyrolized will provide a high yield of carbon. The $TiO_2$ particles can be uniformly mixed into the liquid precursor and then pyrolized. The precursor will produce a carbon film uniformly and intimately in contact with the individual $TiO_2$ particles. Example liquid precursors that have a high yield of carbon when pyrolized are furfural alcohol, resins such as phenyol formalide (phenolics) and pitches (coal and petroleum tars). Sugars and other materials can be used but their carbon char yield is low. Pitches have melting points from under 100° C. up to nearly 400° C. $TiO_2$ was mixed with phenolic resin such as Borden B1008 and heated to form a solid at approximately 110° C. $TiO_2$ was mixed with a 110° C. softening point coal tar pitch at a mixing temperature of 190° C. The char yield on the phenolic or coal tar pitch is approximately 50%. A stoichiometric mixture of each type of precursor was heated to temperatures of 1300° C. to 1650° C. with the results subjected to XRD analysis. The lower temperature, the 1450° C. example is shown in FIG. 8. As can be seen the major portion is TiO but some higher oxide of $Ti_2O_3$ remains; however, the amount of TiO produced is greater than when only particles of carbon and $TiO_2$ were heated together, and importantly no TiC was formed. The XRD of the sample heated to 1650° C. is shown in FIG. 9. At this temperature of 1650° C. heating at atmospheric pressure pure TiO is produced. The atmospheric pressure treatment is quite economical and the pure TiO produced can be used to electrolytically produce low cost titanium, e.g., by the electrochemical reduction method described in our aforementioned parent application.

The intimate mixing of the carbon precursor with the metal oxide can also be used to purify titania type ores. For example rutile ore, titania slag or ilmenite ore can be purified to a higher purity titanium oxide utilizing the intimate mixing of the carbon reductant. Titania slag which is a by product of pig iron production from ilmenite ore, obtained through QIT in Canada which has the composition shown in Table 1 was mixed with a 110° C. softening point coal tar pitch at 190° C. to obtain an intimate mixture of the carbon precursor and the slag particulate.

TABLE 1

Composition of $TiO_2$ slag, a byproduct of pig iron production from Ilmenite.

| Compound | Elemental composition in parts per million (ppm) |
|---|---|
| Al | 2500 |
| Ba | <100 |
| Be | <100 |
| Ca | <100 |
| Cd | <100 |
| Co | <100 |
| Cr | <100 |
| Cu | <100 |
| Fe | 7500 |
| Hf | <100 |
| K | <100 |
| Mg | 1500 |
| Mn | <100 |
| Mo | <100 |
| Na | <100 |
| Nb | <100 |
| Ni | <100 |
| P | <100 |
| Pb | <100 |
| Si | 10,000 |
| Sn | <100 |
| Ta | <100 |
| Ti | 510,000 |
| V | 2000 |
| W | 2700 |
| T | <100 |
| Zn | <100 |
| Zr | <100 |

The mixture was heated to 1650° C. in an argon inert atmosphere wherein the coal tar pitch was pyrolized with the heat treatment producing carbon in intimate contact with the titania slag particulate. The intimate carbon contact with the slag particulate produced TiO with the composition shown in Table 2.

TABLE 2

Composition of $TiO_2$ slag from Ilmenite after the intimate mixture with pitch and heating to 1650° C. in an inert atmosphere.

| Compound | Elemental composition in parts per million (ppm) |
|---|---|
| Al | 5500 |
| Ba | <100 |
| Be | <100 |
| Ca | <100 |
| Cd | <100 |
| Co | <100 |
| Cr | <100 |
| Cu | <100 |
| Fe | 1200 |
| Hf | <100 |
| K | <100 |
| Mg | <100 |
| Mn | <100 |
| Mo | <100 |
| Na | <100 |
| Nb | <100 |
| Ni | <100 |
| P | <100 |
| Pb | <100 |
| Si | 1800 |
| Sn | <100 |
| Ta | <100 |
| Ti | 745,000 |
| V | 2800 |
| W | 3200 |
| T | <100 |
| Zn | <100 |
| Zr | <100 |

Figure 10:
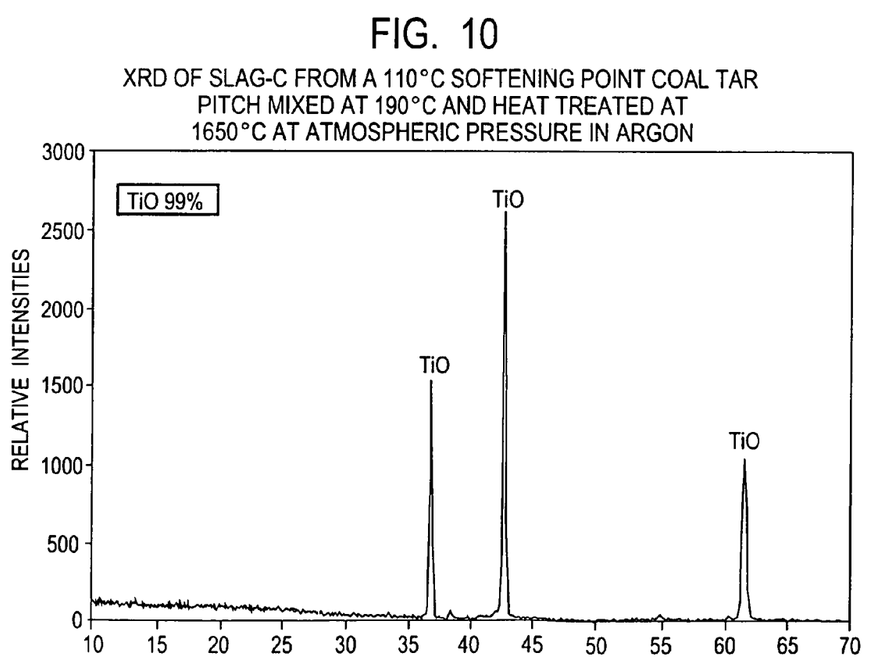
FIG. 10 shows the XRD patterns of slag-C from a 110° C. softening point coal tar pitch mixed at 190° C. and heat treated at 1650° C. at atmospheric pressure in argon.

As can be seen in the carbothermic reduction, slag is purified from approximately 95% purity to 99+% purity utilizing the intimate carbon pretreatment before the heat treatment to 1650° C. The XRD after the 1650° C. treatment with the carbon in intimate contact with the $TiO_2$ slag is shown in FIG. 10.

Ilmenite which is iron titanite $FeTiO_3$ with a variety of impurities consists typically of the composition shown in Table 3.

TABLE 3

Composition of Ilmenite ore.

| Element | Elemental Composition Parts per million (ppm) |
|---|---|
| Al | 4400 |
| B | <100 |
| Ba | <100 |
| Be | <100 |
| Ca | 200 |
| Cd | <100 |
| Co | <100 |
| Cr | 500 |
| Cu | <100 |
| Fe | 19.5% |
| HF | <100 |
| K | <100 |
| Li | <100 |
| Mg | 1400 |
| Mn | 9400 |
| Mo | <100 |
| Na | 400 |
| Nb | 500 |
| Ni | <100 |
| P | 800 |
| Pb | <100 |
| Si | 1500 |
| Sn | 100 |
| Ta | <100 |
| Ti | 38.5% |
| V | 650 |
| W | <100 |
| Y | <100 |
| Zn | 200 |
| Zr | <100 |

The ilmenite ore was mixed with 110° C. softening point coal tar pitch heated to 190° C. to provide intimate mixture of stoichiometric carbon and the ilmenite ore particles. The mixture was heated to 1650° C. heat treatment in an inert atmosphere which pyrolized the pitch providing intimate contact of the carbon on metal oxide particles. The chemical composition after the 1650° C. in an inert atmosphere which pyrolized the pitch providing intimate contact of the carbon on the metal oxide particles is shown in Table 4 and the XRD in FIG. 11.

TABLE 4

Composition of product after heating Ilmenite ore with an intimate mixture of carbon to 1650° C.

| Element | Elemental Composition Parts per million (ppm) |
|---|---|
| Al | 7100 |
| B | <100 |
| Ba | <100 |
| Be | <100 |
| Ca | <100 |
| Cd | <100 |
| Co | 100 |
| Cr | <100 |
| Cu | <100 |
| Fe | 300 |
| Hf | <100 |
| K | <100 |
| Li | <100 |
| Mg | <100 |
| Mn | <100 |
| Mo | 300 |
| Na | <100 |
| Nb | 200 |
| Ni | <100 |
| P | <100 |
| Pb | <100 |
| Si | <100 |
| Sn | 100 |
| Ta | <100 |
| Ti | 76.0% |
| V | <100 |
| W | <100 |
| Y | <100 |
| Zn | <100 |
| Zr | <100 |

Figure 11:
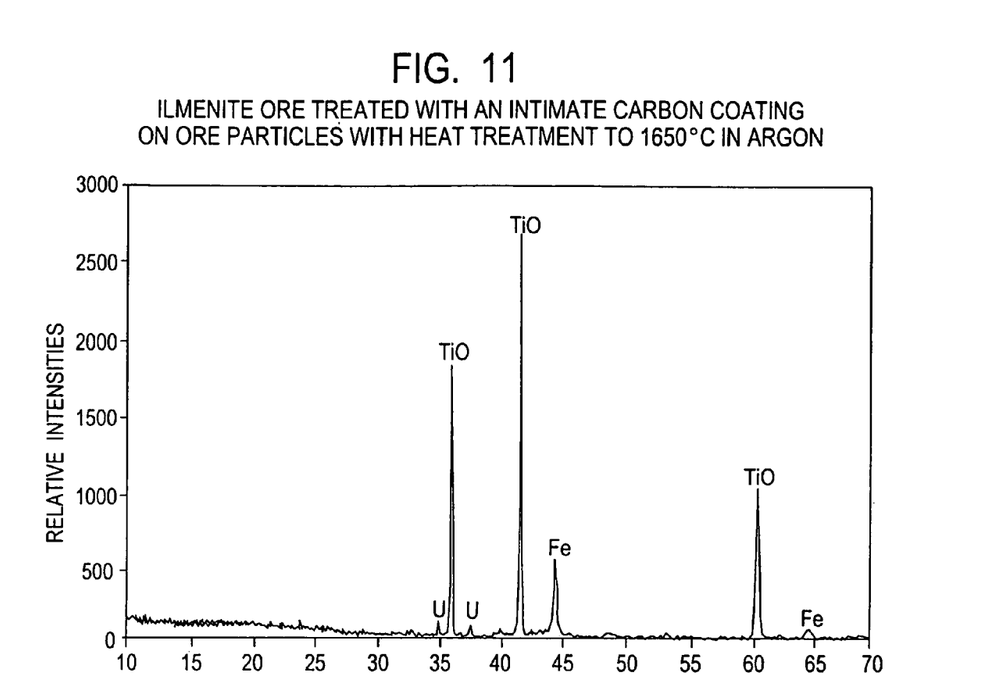
FIG. 11 shows the XRD patterns for Ilmenite ore treated with an intimate carbon coating on ore particles with heat treatment to 1650° C. in argon.
Figure 12:
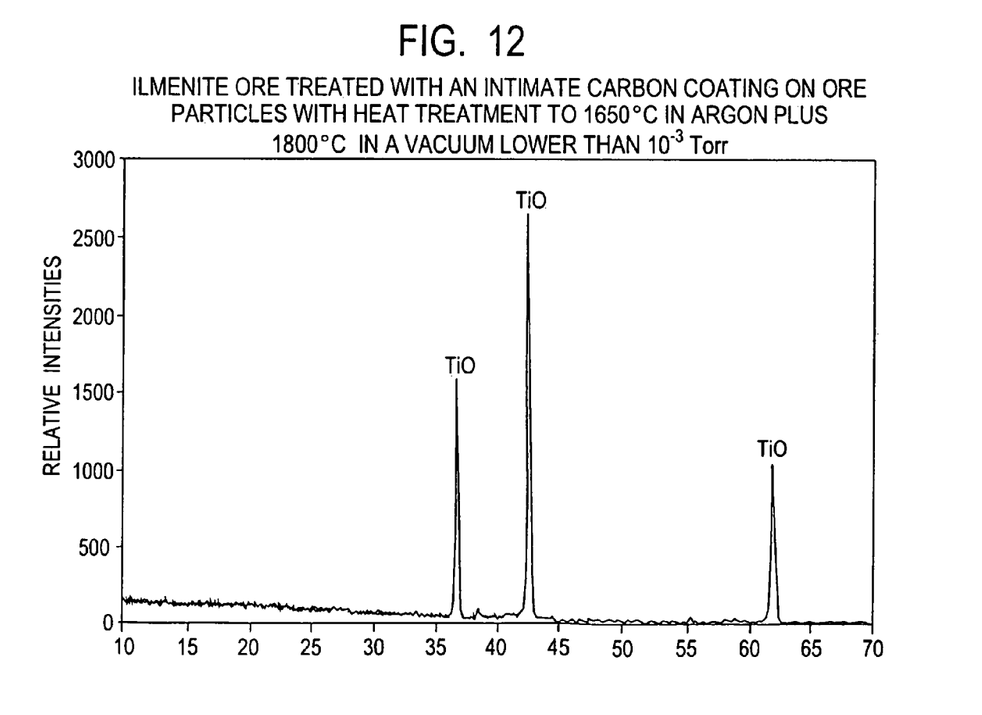
FIG. 12 shows the XRD patterns for Ilmenite ore treated with an intimate carbon coating on ore particles with heat treatment to 1650° C. in argon plus 1800° C. in a vacuum lower than $10_{-3}$ Torr.

Note the XRD pattern in FIG. 11 shows iron metal is present. The iron metal can be removed by leaching and/or complexing in an aqueous solution at ambient temperature. The iron and other impurities can be removed by heating in a vacuum less than $10_{-3}$ Torr to 1800° C. after or instead of the 1650° C. heat treatment. The purity of the high vacuum 1800° C. treated material is shown in Table 5 and the XRD in FIG. 12.

TABLE 5

Composition of product after heating Ilmenite ore with an intimate mixture of carbon to 1650° C. with a second heat treatment to 1800° C. in a vacuum less than $10^{-3}$ Torr.

| Elements | Composition Parts per million (ppm) |
|---|---|
| Al | 6300 |
| B | <100 |
| Ba | <100 |
| Be | <100 |
| Ca | <100 |
| Cd | <100 |
| Co | <100 |
| Cr | <100 |
| Cu | <100 |
| Fe | 100 |
| HF | <100 |
| K | <100 |
| Li | <100 |
| Mg | <100 |
| Mn | <100 |
| Mo | 300 |
| Na | <100 |
| Nb | 200 |
| Ni | <100 |
| P | <100 |
| Pb | <100 |
| Si | <100 |
| Sn | 100 |
| Ta | <100 |
| Ti | 85% |
| V | <100 |
| W | <100 |
| Y | <100 |
| Zn | <100 |
| Zr | <100 |

Examples of producing titanium metal with a starting feed of $TiO_2$ or impure ore are given in the following working examples:

EXAMPLE 1

Preparation

1. A $TiO_2$ pigment type feed obtained from the DuPont Company was mixed with powdered coal tar pitch (CTP) and a solvent of normal methyl pyrrolidone (NMP). The ratio was 80 parts $TiO_2$ and 30 parts of a 110° C. CTP and 80 parts of NMP. The NMP provides good fluidity of the mix and dissolves a portion of the CTP. After mixing by stirring, signal blade mixing, ball milling, attrition milling, etc. the mix is heated to evaporate the NMP for collection and reuse. The $TiO_2$ particulate is fully coated and intimately mixed with the pitch which chars or cokes to about 50% carbon with continued heating. The mixture was heated to 1700° C. under atmosphere pressure in a non-oxidizing atmosphere which is typically argon, $CO_2$, CO, etc. Nitrogen atmosphere is avoided to prevent the formation of titanium nitride. After the 1700° C. treatment the product was pure TiO with an XRD pattern analogous to that shown in FIG. 9. The produced TiO was utilized in four different trials to electrolytically produce titanium particulate. The trials were as follows:

Trial 1—The TiO was mixed with a 110° C. coal tar pitch which served as a binder and carbon black particulate to provide a stoichiometric mixture of TiO and carbon based on an off gas of 1:1 $CO_2$/CO. The mixture was pressed in a steel die at 190° C. to provide a solid on cooling. The composite anode was heated in an inert atmosphere to 1200° C. which pyrolized/carbonized the pitch binder. Resin or other precursors which yield carbon on heating in an inert atmosphere are satisfactory binders for producing a solid anode. The composite anode was utilized in a fused salt electrolyte consisting of the tri-eutectic of Li—K—Na chlorides. Virtually any fused salt mixture of the alkali and/or alkali halides are satisfactory as an electrolyte. A stainless cathode was used in a cell maintained in an inert atmosphere with electrolysis at 1 amp/cm$_2$ which produced titanium metal particulate in the size range of 10-500 microns.

Trial 2—The TiO was used as a cathode in a salt composition of 80% CaCl$_2$-20% LiCl operated at 850° C. The TiO was ground to minus 100 mesh (147 microns). The TiO particles were placed in a stainless steel mesh and placed in the salt electrolyte as a cathode with a graphite anode. A potential of 3.0V was applied between the graphite anode and TiO particles contained in the stainless mesh cathode. After 30 hours of electrolysis the cathodic particles were analyzed as titanium metal with a residual oxygen content of 2500 parts per million. During the electrolysis the anode gas was analyzed with a mass spectrometer to be primarily CO$_2$ with traces of CO.

Trial 3—The same electrolyte as in Trial 2 was utilized at the same temperature of 850° C. In this trial the TiO was ground to a minus 325 mesh (less than 44 microns). Two weight percent TiO was added to the electrolyte with stirring. After one hour stirring a stainless tube cathode was used with a 600 mesh stainless screen covering the bottom of the tube. A graphite rod was placed in the center of the stainless tube. Electrolysis was performed with the stainless tube as the cathode and the graphite rod as the anode. A cathode current density of 1 amp/cm$_2$ was utilized. After two hours electrolysis of the cathode anode assembly was removed from the salt electrolyte and water washed. Titanium metal particulate was produced in the size range of approximately 1 to 200 microns which demonstrates the TiO had solubility in the electrolyte in order to yield titanium metal on electrolysis.

Trials 4A and 4B—A closed cell inert atmosphere system was utilized that had tungsten coil resistors between two electrodes in the bottom of the reactor. Calcium fluoride (CAF$_2$) was used as the electrolyte and power applied to the tungsten resistors that brought the CaF$_2$ to a molten state and 1700° C. In Trial 4A, a TiO particle as given in Trial 2 was placed in a molybdenum screen and electrolyzed at 3.0V as a cathode with a graphite anode. Titanium was produced as a molten glob in the molybdenum screen. In Trial 4B, TiO-325 mesh was added to the CaF$_2$ electrolyte and electrolysis performed between a molybdenum cathode and a graphite anode. Molten droplets of titanium metal were produced at the molybdenum cathode which shows the TiO had solubility in the CaF$_2$ electrolyte at 1700° C. producing titanium metal in the molten state due to the electrolysis.

EXAMPLE 2

Preparation

Ilmenite ore obtained from QIT—Fer et Titane, Inc., of Quebec, Canada, which had the composition shown in Table 3 was mixed at room temperature with 110° C. softening point powdered coal tar pitch (CTP) in a ratio of 100 grams of ilmenite ore to 40 grams of CTP and 100 grams of toluene. The mixture was ball milled for four hours at room temperature to achieve good mixing and then heated to evaporate the toluene which was collected for reuse. The mixture was further heated to 1700° C. under an inert atmosphere at atmospheric pressure followed by reducing the pressure to $10^{-3}$ Torr or less and the temperature raised to 1800° C. and held for one hour. After cooling the treated ilmenite ore had the composition shown in Table 5. The purified TiO product was subjected to the same electrolysis trials listed in Trials 1, 2 and 5 producing purified titanium metal from an impure ore.

Trial 5—The same set-up was used as given in Trial 2. In this case hydrogen gas was bubbled over the TiO in the cathode. After electrolysis at 3V for 30 hours the titanium particles were subjected to vacuum evaporation of the residual salt at 1200° C. and $10^{-5}$ Torr vacuum. The residual oxygen content was 300 ppm.

It should be noted that since TiO is an electronic conductor with a conductivity superior to graphite, electrical contact is easily made which eliminates the necessity to form a partially sintered porous body to serve as a cathode for the electrolytic reduction to Ti metal particles. In the case of cathodic reduction of TiO$_2$ to the metal it is necessary to produce a porous perform in order that current can flow to the TiO$_2$ body whereas with the high electrolytic conduction of TiO particles are easily contacted to achieve cathodic reduction and making it possible for the continuous cathodic reduction as compared to batch processing of porous TiO$_2$ preforms.

The concentrations of titanium and oxygen in TiO are 74.96% titanium and 25.04% oxygen. This composition of TiO is typical of the material such as shown in FIG. 9. However, it is possible to further reduce the oxygen content to produce up to approximately 92% titanium. The higher titanium content is desirably obtained carbothermically which results in less electronic reduction in a second electrolysis step to obtain pure metallic titanium with very low oxygen contents of less than 500 ppm. Greater carbothermic reduction can be achieved by heating to higher temperatures than the 1650-1700° C. as above described.

Figure 13:
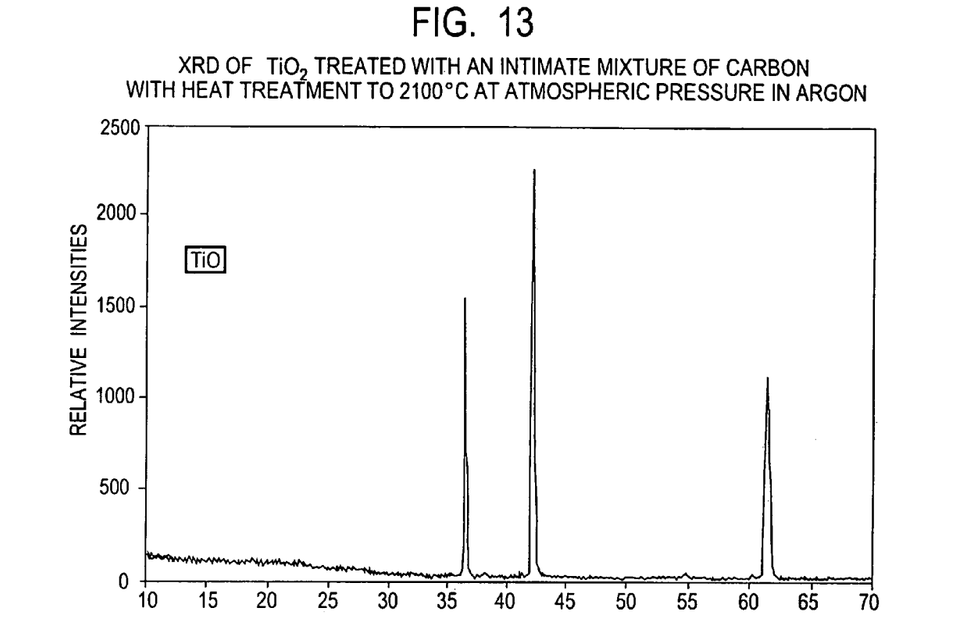
FIG. 13 shows the XRD patterns of $TiO_2$ treated with an intimate mixture of carbon with heat treatment to 2100° C. at atmospheric pressure in argon.

Samples of TiO$_2$ (the ores of ilmenite, rutile, slag, etc can also be used), and carbon when intimately mixed and heated to higher temperatures, produces a higher titanium content in the remaining product. TiO$_2$ was intimately mixed at 190° C. with coal tar pitch in stoichiometric ratio to produce low oxygen content titanium and was heated to 2100° C. in a non-oxidizing atmosphere. The XRD of the product is shown in FIG. 13. The analysis of the product obtained from an outside laboratory, Wah Chang, showed a residual oxygen content of 5.4%. Residual carbon content is quite low in the range of 0.7 to 2%.

A sample was heated to 2800° C. in a non-oxidizing atmosphere in a graphite container. The XRD of that product showed primarily TiC which is believed the graphite crucible contributed to the TiC formation. A TiC crucible was fabricated and a TiO$_2$—C sample was heat treated to 2800° C. which resulted in little TiC and a reduced oxygen content of less than TiO in the residual titanium.

Figure 14:
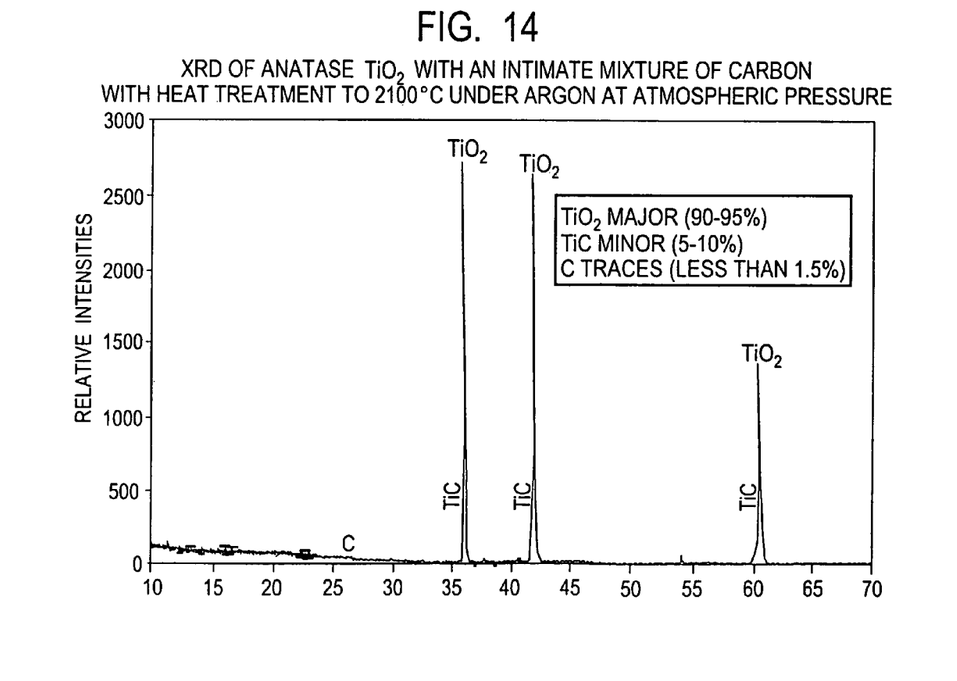
FIG. 14 shows the XRD patterns for Anatase $TiO_2$ with an intimate mixture of carbon with heat treatment to 2100° C. under argon at atmospheric pressure.

It is known that when TiO$_2$ and carbon are heated above about 1200° C. the product is a mixture of TiO and TiC. It is noted here that TiO$_2$ when heated at atmospheric pressure and/or at reduced pressure only TiO is produced as exemplified in the XRD patterns shown in FIGS. 10, 12 and 13 and verified from carbon and oxygen analysis which showed less than 1% carbon thus ruling out any appreciable amount of TiC formation with a remaining oxygen content depending on the heat treatment temperature of down to about 5% oxygen at 2100° C. It was also noted there was some difference in reactivity between the crystal forms of TiO$_2$ in rutile and anatase. The qualative results showed that anatase was more likely than rutile to produce a slight amount of TiC at 2100° C. than rutile as shown in the XRD pattern in FIG. 14. To produce TiO$_x$ X≦1 at atmospheric pressure and/or vacuum an enabling step is the intimate mixing of the TiO$_2$/ore source with the carbon source as a pitch, resin or other carbon source in the liquid state.

The metal oxide produced by carbothermic reduction as above-described may then be formed into a feed electrode or used as a solute in the electrochemical reduction system described in our above parent application, Ser. No. 10/828,641.

The above embodiments and examples are given to illustrate the scope and spirit of the instant invention. These embodiments and examples are within the contemplation of the present invention. Therefore, the present invention should be limited only by the appended claims.

What is claimed is:

1. A method for separating a metal from its oxide ore, which comprises first producing a lower oxide of said metal by heating the oxide ore to a temperature of 1400-1800° C. under an inert atmosphere in the presence of a reductant, and thereafter subjecting the resulting lower oxide of said metal to an electrochemical reduction to won the metal from said lower oxide.

2. The method of claim 1, wherein the reductant comprises a source of carbon or graphite.

3. The method of claim 2, wherein the carbon comprises a coal tar pitch.

4. The method of claim 2, wherein the carbon source comprises furfural alcohol.

5. The method of claim 2, wherein the carbon source comprises a resin.

6. The method of claim 5, wherein the resin comprises a phenolic resin.

7. The method of claim 1, wherein the heating is conducted in two steps.

8. The method of claim 1, wherein the ore comprises titanium oxide.

9. The method of claim 1, wherein said ore is heated under an inert atmosphere, under a partial vacuum, in the presence of a reductant.

10. A method for the production of a metal from its oxide ore, comprising the steps of:
  (a) heating the ore under an inert atmosphere in the presence of a reductant, whereby to produce a lower oxide of said metal; and
  (b) subjecting the lower oxide of said metal produced in step (a) to an electrochemical reduction.

11. The method of claim 10, wherein the metal oxide from step (a) is mixed with carbon and formed into an anode for use in the electrochemical reduction of step (b).

12. The method of claim 10, wherein the ore comprises titanium oxide.

13. The method of claim 10, wherein the ore is heated in step (a) under an inert atmosphere, under a partial vacuum, in the presence of a reductant.

14. The method of claim 10, wherein the lower oxide of said metal produced in step (a) is employed as a solute in the electrochemical reduction in step (b).

15. The method of claim 10, wherein the lower oxide of said metal produced in step (a) is formed into an electrode and employed as a feed electrode in the electrochemical reduction in step (b).

16. A method for separating a metal from its oxide ore, which comprises first producing a lower oxide of said metal by heating the oxide ore under an inert atmosphere in the presence of a coal tar pitch, and thereafter subjecting the resulting lower oxide to winning.

17. The method of claim 16, wherein the heating is conducted at a temperature of 1100-2100° C.

18. The method of claim 17, wherein the heating is at a temperature of 1400-1800° C.

19. The method of claim 16, wherein the heating is conducted in two steps.

20. The method of claim 16, wherein the ore comprises titanium oxide.

21. The method of claim 16, wherein said ore is heated under an inert atmosphere, under a partial vacuum, in the presence of a reductant.

22. A method for separating a metal from its oxide ore, which comprises first producing a lower oxide of said metal by heating the oxide ore under an inert atmosphere in the presence of furfural and thereafter subjecting the resulting lower oxide to an electrochemical reduction to won the metal from said lower oxide.

23. The method of claim 22, wherein the heating is conducted at a temperature of 1100-2100° C.

24. The method of claim 23, wherein the heating is at a temperature of 1400-1800° C.

25. The method of claim 22, wherein the heating is conducted in two steps.

26. The method of claim 22, wherein the ore comprises titanium oxide.

27. The method of claim 22, wherein said ore is heated under an inert atmosphere, under a partial vacuum, in the presence of a reductant.

28. A method for separating a metal from its oxide ore, which comprises first producing a lower oxide of said metal by heating the oxide ore under an inert atmosphere in the presence of a resin, and thereafter subjecting the resulting lower oxide to an electrochemical reduction to won the metal from said lower oxide.

29. The method of claim 28, wherein the heating is conducted at a temperature of 1100-2100° C.

30. The method of claim 29, wherein the heating is at a temperature of 1400-1800° C.

31. The method of claim 28, wherein the resin comprises a phenolic resin.

32. The method of claim 28, wherein the heating is conducted in two steps.

33. The method of claim 28, wherein the ore comprises titanium oxide.

34. The method of claim 28, wherein said ore is heated under an inert atmosphere, under a partial vacuum, in the presence of a reductant.

35. A method for separating a metal from its oxide ore, which comprises first producing a lower oxide of said metal by heating the oxide ore, in two steps, under an inert atmosphere in the presence of a reductant, and thereafter subjecting the resulting lower oxide to an electrochemical reduction to won the metal from said lower oxide.

36. The method of claim 35, wherein the reductant comprises a source of carbon or graphite.

37. The method of claim 36, wherein the heating is conducted at a temperature of 1100-2100° C.

38. The method of claim 35, wherein the source of carbon comprises a coal tar pitch.

39. The method of claim 35, wherein the source of carbon comprises furfural alcohol.

40. The method of claim 35, wherein the source of carbon comprises a resin.

41. The method of claim 40, wherein the resin comprises a phenolic resin.

42. The method of claim 40, wherein the ore comprises titanium oxide.

43. The method of claim 40, wherein said ore is heated under an inert atmosphere, under a partial vacuum, in the presence of a reductant.

44. A method for separating a metal from its oxide ore, which comprises first producing a lower oxide of said metal by heating the oxide ore under an inert atmosphere, under partial vacuum, in the presence of a reductant, and thereafter subjecting the resulting lower oxide to an electrochemical reduction to won the metal from said lower oxide.

45. The method of claim 44, wherein the reductant comprises a source of carbon or graphite.

46. The method of claim 45, wherein the source of carbon comprises a coal tar pitch.

47. The method of claim 45, wherein the source of carbon comprises furfural alcohol.

48. The method of claim 45, wherein the source of carbon comprises a resin.

49. The method of claim 48, wherein the resin comprises a phenolic resin.

50. The method of claim 44, wherein the heating is conducted at a temperature of 1100-2100° C.

51. The method of claim 50, wherein the heating is at a temperature of 1400-1800° C.

52. The method of claim 44, wherein the ore comprises titanium oxide.

* * * * *